Figure 1:
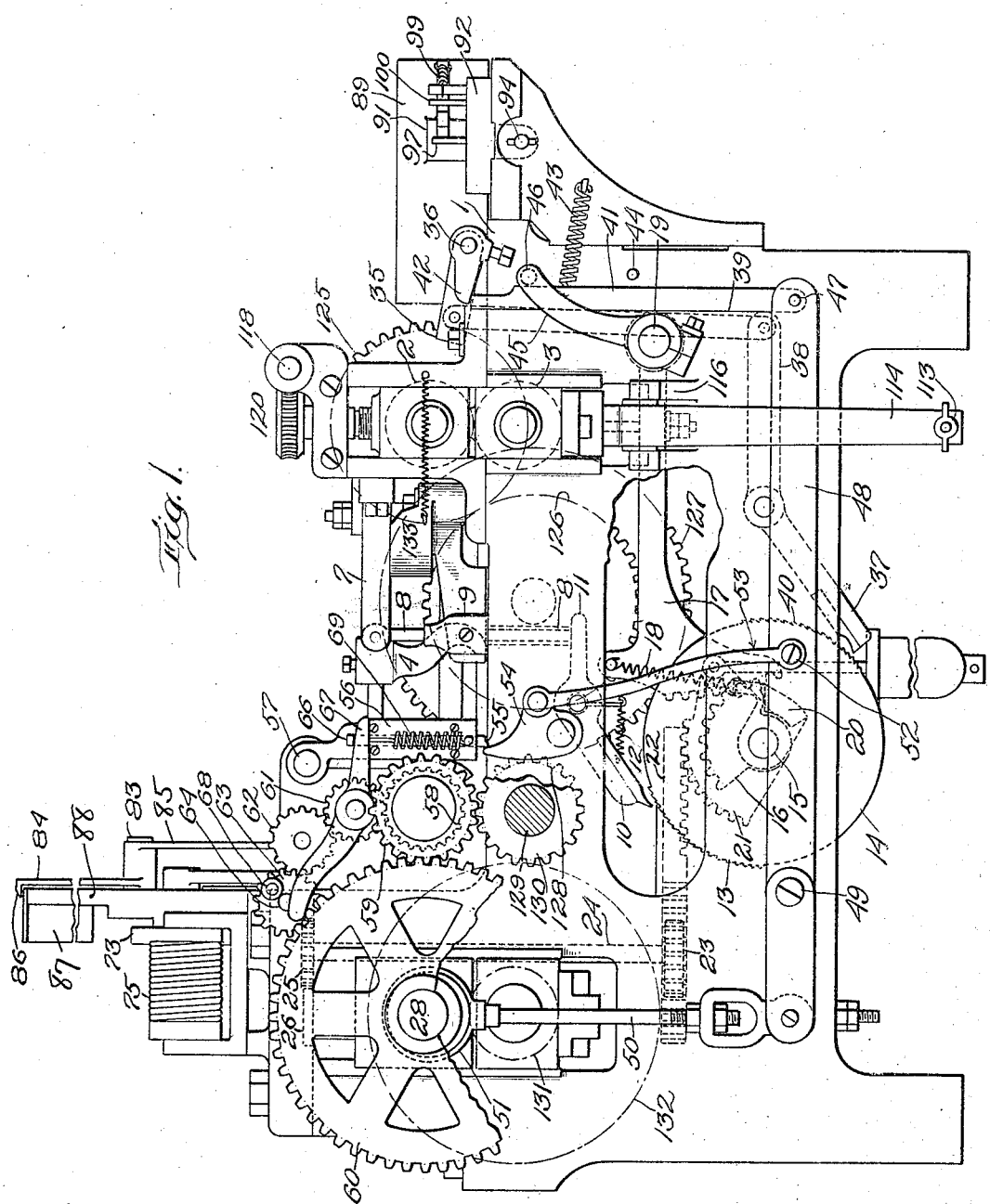

E. P. NICHOLS.
MACHINE FOR EVENING AND GRADING CUT SOLES AND THE LIKE.
APPLICATION FILED AUG. 23, 1912.

1,130,321.

Patented Mar. 2, 1915.

4 SHEETS—SHEET 2.

Witnesses:
James R. Hodder.
R. J. Hersey

Inventor:
Elmer P. Nichols,
by Geo. H. Maxwell
Atty.

E. P. NICHOLS.
MACHINE FOR EVENING AND GRADING CUT SOLES AND THE LIKE.
APPLICATION FILED AUG. 23, 1912.
1,130,321.
Patented Mar. 2, 1915.
4 SHEETS—SHEET 3.
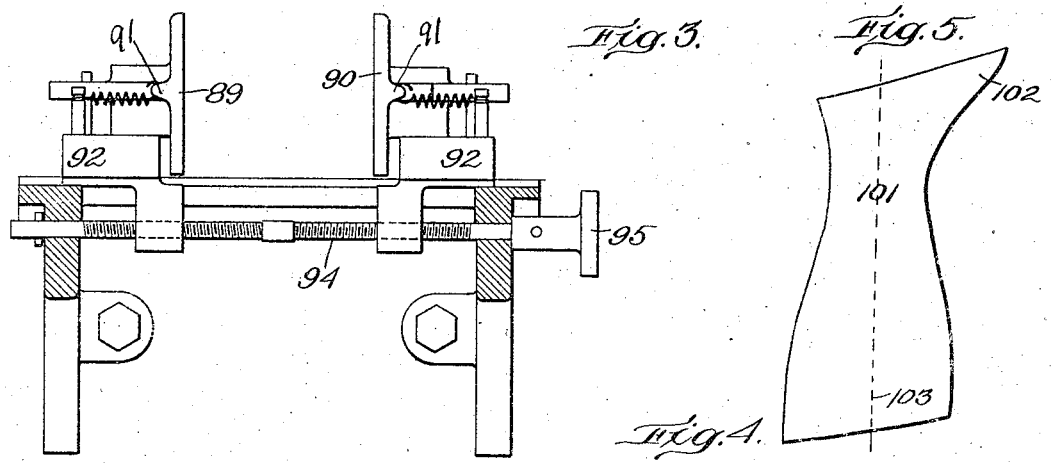
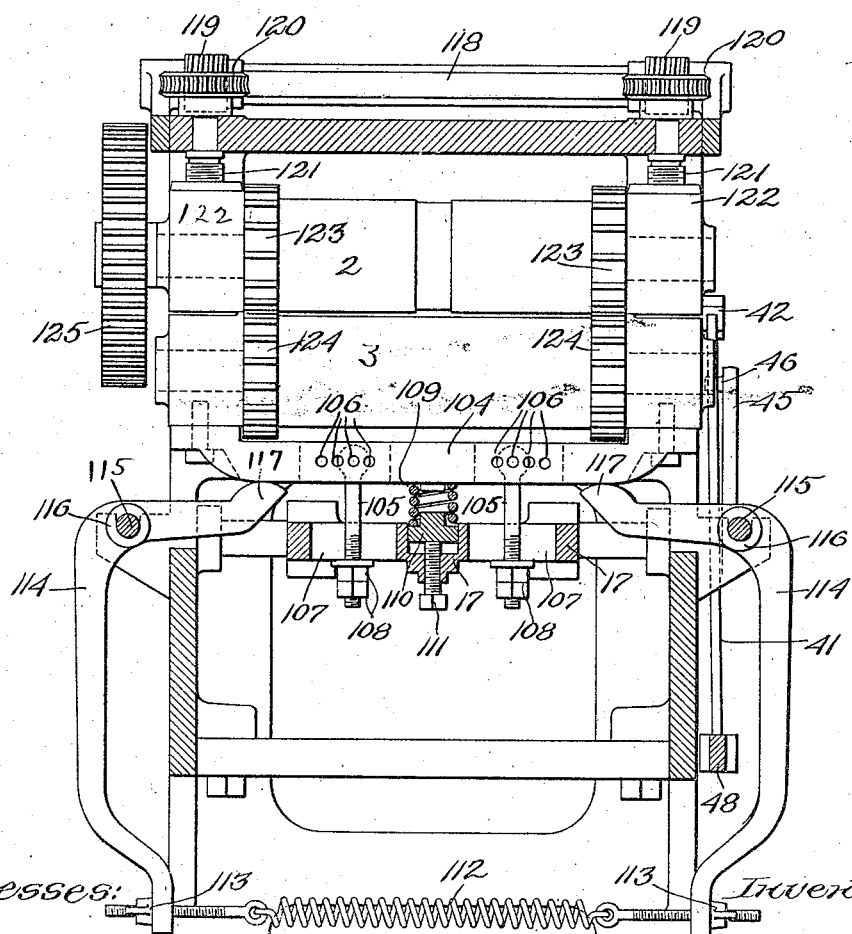

E. P. NICHOLS.
MACHINE FOR EVENING AND GRADING CUT SOLES AND THE LIKE.
APPLICATION FILED AUG. 23, 1912.
1,130,321.
Patented Mar. 2, 1915.
4 SHEETS—SHEET 4.
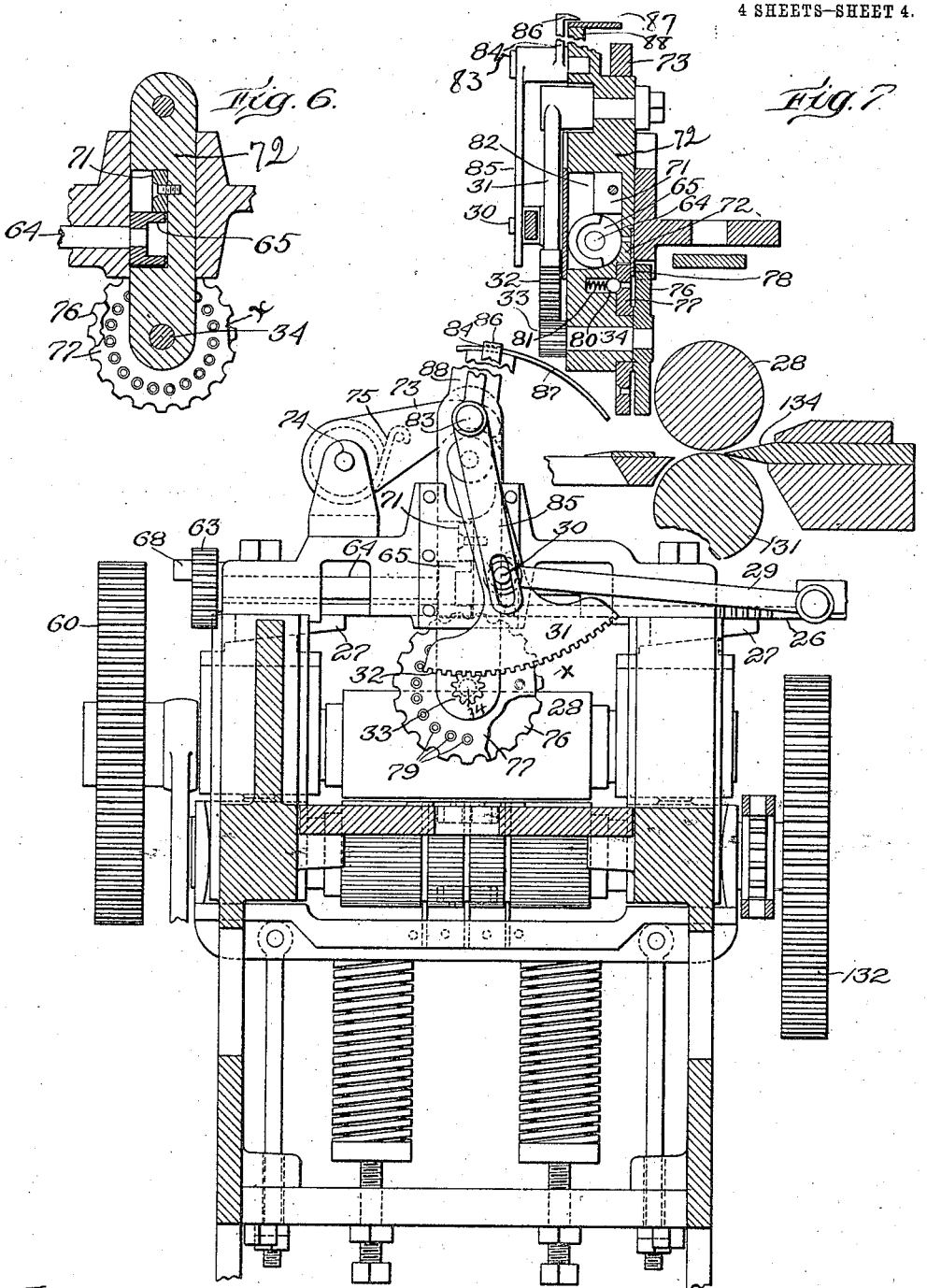
Witnesses:
James R. Hodder.
R. J. Hersey
Inventor:
Elmer P. Nichols,
by Geo. W. Maxwell
atty.

UNITED STATES PATENT OFFICE.

ELMER P. NICHOLS, OF MANCHESTER, NEW HAMPSHIRE, ASSIGNOR TO LACENE MANUFACTURING COMPANY, OF MANCHESTER, NEW HAMPSHIRE, A CORPORATION OF MAINE.

MACHINE FOR EVENING AND GRADING CUT SOLES AND THE LIKE.

1,130,321.        Specification of Letters Patent.        Patented Mar. 2, 1915.

Application filed August 23, 1912.   Serial No. 716,776.

*To all whom it may concern:*

Be it known that I, ELMER P. NICHOLS, a citizen of the United States, and resident of Manchester, county of Hillsboro, State of New Hampshire, have invented an Improvement in Machines for Evening and Grading Cut Soles and the like, of which the following description, in connection with the accompanying drawings, is a specification, like letters on the drawings representing like parts.

My invention is an improvement relating to that type of machines whose purpose, use and general construction are set forth at length in my Reissue Patent No. 12,288, dated November 22, 1904, and later Patents Nos. 841,809, dated January 22, 1907, 1,009,988, dated November 28, 1911, 1,046,213, dated December 3, 1912, and 1,057,358, dated Mar. 25, 1913, my present invention relating more particularly to that form and arrangement of the mechanism contained in my copending application Serial No. 507,728, filed July 15, 1909, now Patent No. 1,058,623, dated April 8, 1913.

One of the main objects of this invention is to facilitate the output of the machine and make it more independent of the skill of the operator. Heretofore these machines have required considerable attention on the part of the operator in feeding the stock into the machine (so as to get it properly centered or positioned) and in distributing the stock when taking it from the machine (the operator being obliged to look at the grade-mark on each piece in order to place it with the others of its grade). In my present machine I have succeeded in eliminating these two principal sources of delay, the first being eliminated by providing an automatic centering or positioning device at the in-going end of the machine, and the second being eliminated by providing, in connection with the grading mechanism, a visual indicator for indicating the grade to the operator while the piece of stock is being evened or marked by the machine.

In evening and grading crooked pieces of stock, such as ordinary cut soles with reference to the edges only, in the type of machines above mentioned, it is essential for the best results that the stock shall go through the machine, i. e. between the rolls or receiving and feeler devices, in the same line, i. e., as herein shown, through the center of the machine. But as these pieces are crooked more or less, the ordinary guides such as shown in my application last mentioned do not serve properly to center the stock. In order therefore, to accomplish the proper centering of the material without requiring any particular skill on the part of the operator, so that an unskilled operator can readily run the machine, I provide means for automatically centering a crooked sole or any other piece of stock which requires one portion thereof to be shifted into central position with reference to another portion of the same piece, so that it shall be in said desired central position before being gripped immovably by the feeler mechanism or detecting devices. As the ball of the sole is always wider than the heel, I provide means in the shape of movable guards or guides arranged to close against the heel so as to shift or guide the heel into the machine in such a direction and position that the middle longitudinal line of the forepart of the sole or of any desired portion of it will coincide with the longitudinal center of the machine, i. e. the line half-way between the feelers or detector posts as the sole is fed into the machine, and then to open for the reception of the ball of the sole and thereby guide and maintain said ball portion also centrally of the machine as it follows along behind the heel portion which has already been fed to the feeler mechanism. In order that these guards or guides or automatic centering devices may be adapted to crooked shapes, I mount them independently of each other, in order that they may yield to the requirements of such crooked shapes as are presented to them but without losing their said centering function. Preferably I provide in connection therewith means for limiting their adjustment for different sizes, and also means specially adapting the machine to operate in connection with block soles having a wide heel, as will be pointed out more at length in connection with the detailed explanation of the mechanism.

A further object of that feature of my invention which is set forth above is to make it practicable to hollow out the rolls wider (more nearly equal to the width of the shank,) my present improvement making it possible to hollow the rolls wider than before. This gives more delicacy of feeling or grading measurement as the hollowed-out part is thereby permitted to be much wider than would otherwise be the case, so that the middle part of the sole is more certain not to engage the rolls and influence the grading (which should be with reference to the edges only).

A further improvement relates to the feeler mechanism whereby I eliminate resistance, as compared with my preceding inventions. I have succeeded in eliminating all but one spring for maintaining the feelers or detectors or detector mechanism against the leather at its opposite edges. By having one spring the detector mechanism, herein shown as a roll, is enabled to rock or tilt lengthwise easier and its operation is not so stiff, but is more flexible and responsive. This mechanism gives more delicacy of touch or feeler engagement against the leather with less tension and with less danger of compressing the leather,—besides various other advantages over my previous construction of said copending application, all of which will be more fully pointed out in the detailed description.

Also at the outgoing end of the machine my invention provides special grade marking mechanism. Means is provided for marking not only the thickness but the size as to length and width. Preferably also, the latter marking means is arranged to be rendered inoperative at the will of the operator, so that the machine will mark simply the thickness automatically without marking the size.

Various other features of improvement in connection with the marking device will appear from the detailed description.

Figure 2:
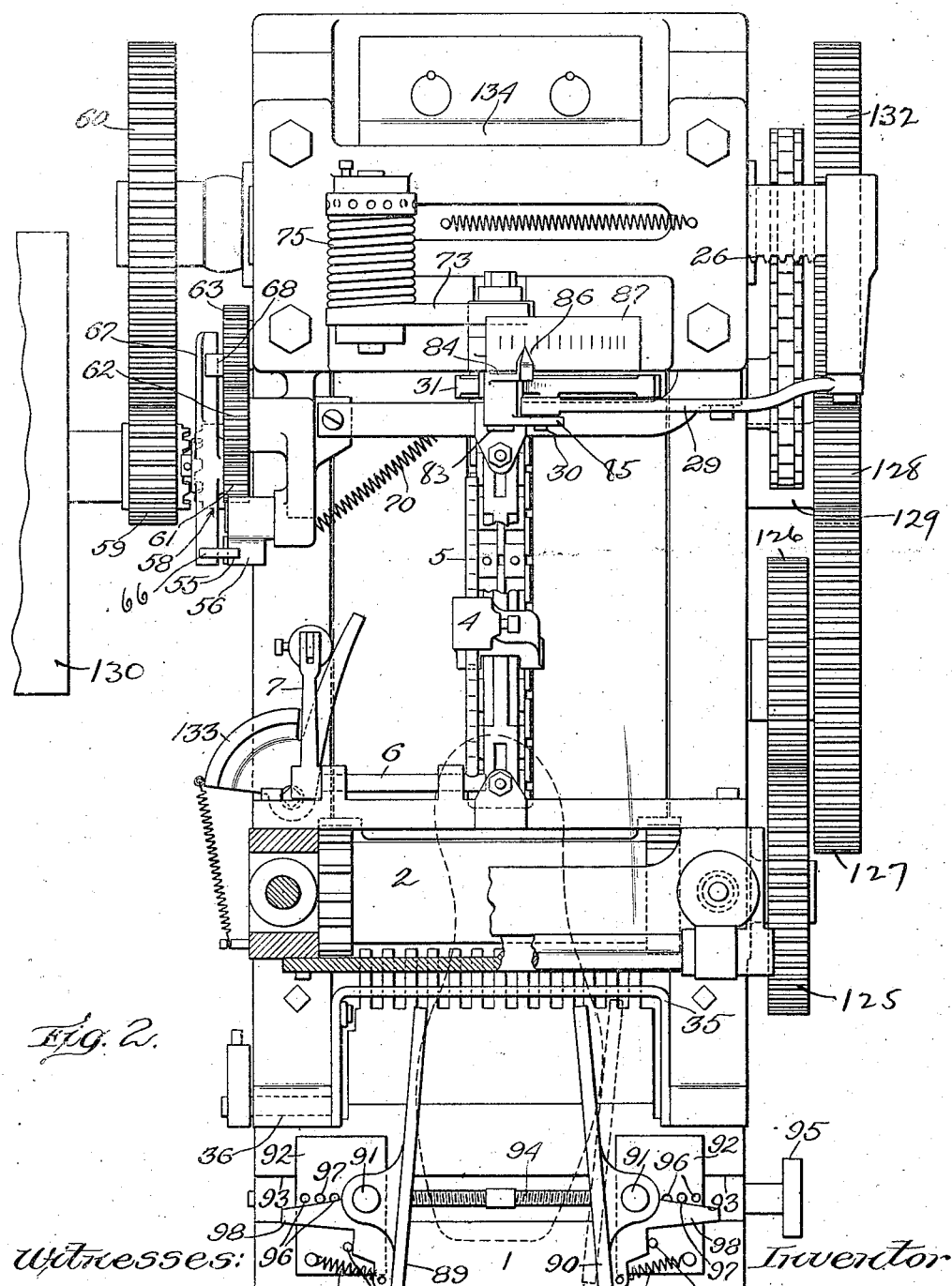

In the drawings, in which I have illustrated a preferred embodiment of a machine containing my various improvements Figure 1 is a view in side elevation of the left hand side of the machine; Fig. 2 is a top plan view thereof partly broken away; Fig. 3 is a fragmentary view mainly in front elevation of the positioning devices; Fig. 4 is a vertical sectional view showing the feeler mechanism viewed from the rear; Fig. 5 is a plan view of a crooked block sole; Fig. 6 is a detail in front elevation (parts being broken away for clearness of illustration) of the visual indicating and grade marking device; Fig. 7 is a vertical transverse section through the marking mechanism looking at the inner end of the lifting cam; and Fig. 8 is a transverse vertical sectional view showing the marking mechanism in front elevation.

Many of the features of my invention are well known in this art because of my previous patented machines for accomplishing the same general purpose and therefore it will be sufficient to explain briefly that the work is fed into the machine from the work table 1 to feed rolls 2, 3, the latter constituting a feeler roll, and when the forward end of the stock strikes and raises the trip 4 on the free end of an arm or lever 5 projecting rearwardly from a rock shaft 6 having at its outer end an arm 7 to which is pivoted a rod 8 carrying an adjustable stop weight 9 said rod 8 releases a pawl 10 on whose rear end 11 it normally rests. A spring 12 immediately causes this pawl to engage the thinness-measuring teeth 13 of a ratchet wheel 14 fastened on a shaft 15 on which is loosely mounted a segmental rack 16 in engagement with the correspondingly toothed end of a lever 17 normally held together or toward each other by a spring 18 and pivoted at 19 to the frame of the machine to transmit the movement of the feeler roll. The gear or rack 16 is in position to strike against a crank or bracket 20 fixed on said shaft 15 the latter also carrying a segmental rack or gear 21 meshing with a rack 22, mounted to reciprocate longitudinally of the machine. Meshing with the rear end of said rack is a pinion 23 fast on the lower end of a shaft 24 which carries at its upper end a pinion 25 meshing with a rack bar 26 which carries adjusting wedges 27 for limiting the vertical movement of the gage rolls 28. Pivoted to the outer end of said rack bar 26 is an operating link 29 which is pivoted at 30 to the actuating lever 31 of the marking mechanism. This lever 31 has a segmental rack 32 at its lower edge meshing with a pinion 33 on the forward end of the marking disk shaft 34.

The timing of the stock feeding is controlled by a gate 35 pivoted at 36, and normally held up by the stock until the following end of the latter has passed into the machine and out from under said gate, whereupon the gate falls and thereby actuates a locking pawl 37 to the rear end 38 of which it is connected by a link 39. When the gate falls this pawl 37 engages the locking teeth 40 of the ratchet wheel 14 to lock the latter in opposition to the pawl 10 and teeth 13 against further measuring movement. When the stock has been graded and has escaped from the machine said gate is restored to raised position by a lifting rod 41 whose upper end engages beneath an arm 42 fast on the pivot 36 of the gate 35, said rod being normally held under a forward swinging tendency by a spring 43 as limited by a stop 44 and the restraint of an arm 45 fast on the outer end of the pivot 19 of the transmission lever 17 previously mentioned, said arm 45 having at its free end a pin 46 projecting against the right hand edge of said rod 41, Fig. 1. The rod 41 is pivoted at its lower end at 47 to a bar 48 pivoted intermediate its ends at 49 to the frame of the machine and connected by a rod 50 and strap 51 to gage roll 28. Thus when the gage roll is raised by a piece of stock the forward end of the bar 48 is thereby lowered so as correspondingly to lower the rod 41, permitting the latter to be swung instantly forward by the spring 43 beneath the arm 42, and then, when the piece of stock escapes from beneath the gage roll 28 the falling of the latter instantly raises the front end of the bar 48 and, through the lifting of the rod 41 lifts the arm 42 and therefore the gate 35 to permit the feeding into the machine of another piece of stock. Pivotally connected at 52 to the bar 48 by a link 53 is a dog 54 shown in Fig. 1 as engaging the latch 55 of a cam plate 56 pivoted at 57 to a fixed part of the machine. The cam plate 56, when in the position Fig. 1, holds in inoperative position the clutch gear 58 that starts the grade marking mechanism, and when swung to the right by the dog 54 releases the clutch so as to permit the latter to be driven by a gear 59 (which also drives the gear 60 on the adjacent end of the gage roll shaft 28) and when thus driven, said clutch gear actuates the train of pinions 61, 62, 63, which rotate the cam shaft 64 of the lifter cam or dropping means 65 (Figs. 7 and 8). The upper end of the latch 55 is laterally deflected at 66 to overhang the adjacent end of a tripping lever 67, whose opposite end is tripped by a pin or projecting tripping roll 68 of the pinion 63, whereby the latch 55 is raised in opposition to its spring 69 as each grade marking operation takes place, thereby permitting the cam plate 56 to be swung instantly back by a spring 70 to the position shown in Fig. 1, so as to render the clutch, and hence the grade operating mechanism, again inoperative.

The foregoing mechanism is the same in certain of my previous machines, as for instance, those of applications Serial Nos. 418,008, filed February 27, 1908, now Patent No. 1,057,358, and 507,728, filed July 15, 1909, now Patent No. 1,058,623, and is not herein claimed *per se*, so that I refer to said other applications for further details and description thereof.

The cam lifter 65 engages a wear plate or lifter block or plunger 71 fast on the marking head or marker carrier 72, held under constant tendency to move downward by the heavy pressure of an arm 73 pivoted at 74 on an adjacent stationary portion of the frame of the machine and engaged by a torsion spring 75. The combination of this torsion spring with the marker is new and claimed in this application, as thereby I am enabled to get a much more uniform and evenly adjusted and adjustable operation of the marking apparatus and a larger range and variety of adjustments as compared with the more or less harsh spring operation of my previous marking mechanisms. At its lower end the head 72 carries the marking shaft 34 of the automatic marking disk or die 76, which is therefore movable up and down with said head. Adjacent said automatic marking wheel (which marks the thinness measurements) is a size wheel or die 77 for marking either the length or width or both simultaneously with the marking of the grade or irons which indicate the proper thickness of the sole as determined by the automatic measuring mechanism. Between the size wheel and thickness wheel, i. e. the two dies just mentioned, is a plate 78 to retain the size wheel. The latter is slabbed off or made shallow at x on one face, so that it may be turned by the operator to an inoperative position whenever it is desired to render the same inoperative and mark the soles only with the thickness die 76. The size wheel or die 77 is provided with a series of depressions or dwells 79 normally engaged by a yielding locking ball 80 held therein by a spring 81, for holding the wheel in whatever position it is turned by the operator. The plate 78 is placed opposite the locking device 80, 81 to hold the wheel 77 with proper resistance and also aids in preventing said wheel from being accidentally disturbed or turned by frictional engagement with wheel 76. When a batch of soles of any given length and width is being run through the machine, the operator turns this size wheel to mark said length and width and it continues to mark the same while the said die wheel 76 is marking the thickness, as long as said batch of soles is being run through the machine. As the thickness die wheel 76 is fast on the shaft 34 and the size die wheel 77 is mounted independently of said shaft and is held by the locking device 80, the result is that although both dies mark each sole, one die turns freely in response to the feeler mechanism, whereas the other die does not turn. One die being under the control of the operator and the other die not being under the control of the operator, renders it possible for the machine to continue to mark a large number of soles with one and the same size mark, while continually varying the thickness mark. The lifter block 71, or plunger which coöperates with the lifter cam 65 is mounted in a closed recess 82 in the head or marker carrier 72, which constitutes a housing and also braces said block, so as to render the mechanism stiffer as compared with my previous mechanisms. This construction is also less expensive in material and labor and contains a less number of parts than heretofore. Pivoted at 83 on the upper end of the head 72 is an indicator arm 84 which extends downwardly below the pivot in the form of a lever 85, and is connected to a portion of the swinging mechanism herein shown as connected to the pivot 30. This arm has an index finger 86 adapted to swing over a graduated plate 87 fixed on the outer end of a bracket or arm 88, which extends upwardly from said head 72 and moves up and down therewith. This plate 87 is graduated to correspond to the measurements and graduations of the thickness die wheel 76, and the proportions of the lever members 84, 85 are such that the index finger 86 is caused to move to the same index or indication of thickness as the die wheel 76, and hence, when the gaging mechanism has adjusted the grade marking mechanism to mark a given piece of stock, it has also adjusted the visual indicator or index 86 to indicate the same grade. By having the lever 84 extend upwardly a considerable distance and the pivot 83 only a short distance from the pivot of the die actuator arm 31, the index finger 86 is given a wide amplitude of movement as compared with that of the die wheel, or in other words, the visual indications are magnified, to enable the operator readily and instantly to see the same while the machine is running at high speed. I have found this feature of very decided value in increasing the output of these machines, inasmuch as it enables the operator, standing as usual at the right hand side of the machine, to distribute the soles with the right hand as rapidly as the machine can be run, and yet to distribute them accurately, while feeding soles into the machine at the same time with the left hand. Coöperating to this same end, i. e. the increase of speed and accuracy of the machine and facilitating the automatic character thereof, so as to permit it to be run practicably with unskilled operators, is the provision of an automatic positioning mechanism at the feeding-in end of the machine, as best shown in Figs. 1, 2, and 3. I provide relatively long guides 89, 90, preferably pivoted back of their middle at 91 and extending thence forwardly as close as practicable to the rolls 2, 3. These guides are pivoted on blocks 92, arranged to slide in ways 93 and adjustable by a right and left threaded adjusting rod 94 and hand wheel 95. Suitable stop means for limiting the swinging movement of the guides on the blocks is provided, holes 96 being herein shown as one convenient means for accomplishing this purpose, in which are removably mounted pins 97 for bearing against the adjacent oblique edge of wings or abutments 98 projecting outwardly from the guides. Springs 99 secured at one end to the outermost ends of the guides and at the other end to the supporting blocks, serve to hold the guides yieldingly in the adjustment determined by said stop pins 97. The purpose of this guide mechanism is to relieve the operator of the necessity of directing the stock centrally as heretofore required and which has called for some skill. All this is now done automatically by these guides which properly center the stock or direct the successive pieces of leather between the rolls in the same line, i. e. through the center. In handling crooked soles, if the center of the heel were entered at the middle of the rolls 2, 3 or in alinement with the center of the machine, the rest of the sole would not pass through the machine in proper relation to the feeler mechanism because the heel portion of a crooked sole is seldom in balanced relation to the rest of the sole but is usually off at one side. In a crooked sole the heel is never equidistant from the opposite sides of the sole at the ball, and hence if the operator placed the end of the heel between the rolls 2, 3 at the middle of the machine, the forepart of the sole would not be properly graded. For this reason the guards 89, 90 are made independently adjustable so that they may be so adjusted as to position the heel end of the sole to the right or left of the center of the machine (according as the sole is a left or right) while yet making the ball lie so that its longitudinal middle coincides with the longitudinal center of the machine. The usual shape of crooked soles requires that the middle of the forepart adjacent the toe shall pass beneath the feelers along the center line of the machine, i. e. equally distant from the two feeler posts, but some shapes of crooked soles require a variation from this position. For instance, a peaked toe sole, or a sole having a great deal of "swing" to it requires a different adjustment in order that the two longitudinal edges of the forepart shall pass beneath the respective feeler posts with a similar average relation of each edge to its post, and my object is to provide a construction of sole-positioning mechanism which will permit all adjustments for all these purposes. As the ball of the sole in any case is always wider than the heel, the guides or guards 89, 90 are first adjusted by the hand wheel 95 to the width of the soles at the ball. The guides or guards close first toward each other under the influence of the springs 99, so far as permitted by the stop pins, and hence are in position to engage against the heel as the soles are fed into the machine, thereby causing the heel to be engaged by the rolls at the proper point to insure that the forepart of the sole shall be so engaged by the rolls as to have its opposite edges in substantially similar relation to the feelers or posts 105. For example, referring to Fig. 2, when the operator desires to feed into the machine a lot of soles having the size and shape shown in dotted lines in said figure, he first takes one of the soles and places its ball between the two guides and then adjusts them toward each other until they loosely embrace said ball. He then places the sole so that its heel end is between the forward ends of the guides and adjacent the bight of the two rolls 2, 3, and, while he holds the sole in the proper position so that, when its forepart would pass through the machine, its opposite edges would pass in proper similar relation to the two feeler posts 105, he adjusts the guide 90 until its forward end bears against the adjacent edge of the heel end of the sole as thus held by the operator. This position of adjustment is indicated in full lines, the guide 90 being shown in Fig. 2 in full lines in the position required for directing the sole properly into the machine as indicated in dotted lines. At the same time he adjusts the guide 89 so that its forward end bears against the adjacent edge of the sole, said adjustment of the guide 89 being likewise indicated by full lines in said Fig. 2. This adjustment of the two guides may bring them into similar angular positions or it may bring them into very dissimilar angular positions, according to the particular kind of crooked sole which is to be positioned. Their angular position, or in other words the position of their forward ends toward or from the central longitudinal line of the machine, is solely for the purpose of insuring that the forward-feeding end of the sole, i. e. the heel end, shall enter between the rolls 2, 3 at such a point as will compel the rear part of the sole, i. e. the forepart which is following through the machine, to enter between the rolls 2, 3 with its opposite edges similarly located with reference to their respective feeler posts 105. This entering position of the heel end may happen to be along the longitudinal center of the machine or slightly at one side or considerably at one side, all depending upon the particular pattern of crooked sole being graded at the moment. Then, as the rolls pull the stock forward into the machine, the guides 89, 90 open for the ball of the sole, as is shown clearly in Fig. 2, in which illustration the guide 90 had to swing considerably (in fact to the dotted position), because of the large bend of the sole on that side, and the guide 89 had to swing only slightly (to the extent indicated by the dotted part of the ball of the sole so far as it is shown overlapping said guide 89 in said Fig. 2. The separate adjustments provided by the pins and holes 96, 97 are for accomplishing the adjustments of the guides for different sizes. Stops (holes and pins, for instance) are provided at 100 for crooked block soles having a wide heel-end, as shown at 101 Fig. 5, to prevent the guides from shifting over the long edge 102 of the heel too far. The stops at 100 permit the setting of one or the other of the forward ends of the guides 89, 90 outward so as not to interfere with the corner 102 when such soles are brought at the actual center line (indicated at 103 Fig. 5) into line with the lengthwise center of the rolls 2, 3. In other words, the stops at 100 prevent the guides from shifting such a sole so far that the center of its shank would be out of line with the center of the machine, as would otherwise be the case because of the long edge or corner 102 of the heel-end of such a sole. For example, if the sole shown in Fig. 5 were to be fed into the machine in the position shown in Fig. 5, the guard 90 would have to be first adjusted to the position shown in dotted lines in Fig. 2 in order that when the heel end 102 of said sole should enter between the rolls 2, 3, the forward end of the guide 90 would permit the extreme projecting corner of the end 102 to enter between the rolls at the required greater distance from the center of the machine than the opposite shorter corner of the same heel end which said respective corners are shown to have from the longitudinal line 103, which is the line to coincide with the center line of the machine in order to bring the opposite edges of the forepart in proper similar relation to their respective feeler posts. Having adjusted the guide 90 to the position shown in dotted lines, the other guide 89 would be adjusted so as to swing its forward end inwardly toward the sole until it would approximately touch the aforesaid shorter corner of the heel end of the sole, Fig. 5. In this position the two guides 90 and 89 would compel the crooked sole 101 of Fig. 5 to enter the machine in such a position that its imaginary line 103 would coincide with the longitudinal center line of the machine and therefore the forepart of said sole would be correctly felt of by the feelers and hence properly graded. Of course, as the sole 101 would be pulled by the rolls 2, 3 forward in the detecting operation, the guide 89 would be compelled to swing on its pivot 91 out of the way of the forwardly moving bulging edge of the forepart of said sole in order to permit said sole to be thus properly felt of and graded. As already stated, the provision of this automatic centering means for the work makes it possible to hollow the rolls 2, 3 of the sole, i. e. to hollow the roll wider, so that the hollow will span a larger proportion of the width each side of the longitudinal center, the result being that the feeling of the soles at their edges is made much more delicate and accurate than when this hollowing of the rolls had to be exceedingly narrow, as heretofore.

On account of the great expense of sole leather, and also because it is desirable to retain all the weight possible of the leather and likewise to have the body of the sole retain as much as possible of its original fullness or thickness and thereby increase its wear, it is desirable that the rolls 2, 3 shall operate as little as possible on the body or longitudinal middle portion of the sole and shall be confined to the edges, this possibility, of course, being necessarily limited by the narrow shank portion of the sole. But in my previous machines, as the guides which were provided for directing the soles along the desired central path or longitudinal middle of the machine had to be set far enough apart to permit the entrance of the widest soles being fed, it will be apparent that the narrower soles were liable to get shifted to one side or the other of said central path, thereby necessitating making the hollow of the roll unduly narrow, lest, if wider, such narrow soles, when accidentally shifted from the true central path, would permit one or the other of their edges to drop into the hollow of the roll and hence give a false detection and be spoiled. All this has been obviated by my present invention, so that the hollow can be given its desired extreme width, because the automatic positioning mechanism insures that the sole will be shifted automatically into the true central path so that the approximate longitudinal center of the body of the sole will coincide with the longitudinal center of the machine and middle of the hollow of the roll as the sole is fed into the machine and is having its edge-thickness determined. For example, if the operator should place a sole out of line, i. e. at one side or the other of said central path, the guides 89, 90 would shift it back into correct position so that there would be no danger of either edge of the narrow shank portion getting so close to the longitudinal middle of the machine that the hollow of the roll would drop over the edge and give a false movement. As the automatic centering or stock-shifting mechanism prevents the accidental misplacement to one side or the other of the sole, the result is that the roll-hollow can be wider with safety than it could be otherwise.

Referring to Fig. 4 where the feeler mechanism proper is shown in more detail, it will be seen that the feeler roll 3 is carried by a bridge or yoke 104 to which are pivoted feeler posts or detectors 105, the pivot pins being adjustable toward and from each other in holes 106 at their upper ends (slots 107 being provided for permitting a corresponding movement of said posts at their lower ends in the transmission lever 17) and having lengthwise adjustment at their lower ends by threaded nuts 108. A spring 109 engaging at its upper end the yoke 104 and engaging at its lower end a block 110 adjustable by a bolt 111 in the transmission lever 17 serves to maintain said yoke and lever yieldingly separated. By having this spring mounted to exert its entire resistance directly between the feeler roll 3 and the transmission lever, the tension is absolutely uniform as the entire spring moves with said parts as distinguished from the spring, for instance, of my applications before mentioned, which was secured at one end to the frame of the machine and hence varied in tension as the transmission lever moved toward or from the frame in response to varying thicknesses of leather. By mounting the spring as herein shown, the spring is required to yield only to the exceedingly small or slight extent which corresponds to the variation in thickness of the leather at one point in the sole, as compared with another point in the same sole, whereas in the previous construction the spring had to yield to an extent corresponding to the whole movement of the transmission lever. The independent yielding of the opposite ends of the feeler roll 3, or the capacity for independent vertical movement of said feeler roll, as required by variations in thickness of the opposite edges of a piece of stock being felt of or measured by the feeler mechanism, is secured by one spring so mounted as to give extreme delicacy. This spring is shown at 112 having threaded adjustment at its opposite ends at 113 in the depending free ends of elbow levers 114, whose gudgeons or pivots 115 are loosely or removably mounted in the upwardly opening bearings 116, and whose inner arc shaped or curved ends 117 bear on the under surface and adjacent the opposite ends of the bridge or yoke 104. Thus the pressure exerted by the single spring 112 is uniformly exerted at the opposite ends of the feeler roll 3, and in such a manner that said roll rocks or tilts at one end or the other with equal facility, and with extreme ease and responsiveness, inasmuch as a downward movement, for instance, of one end and an upward movement of the other end of the roll 3, does not change the pressure of the roll on the stock in the slightest, inasmuch as these movements are compensated by the connected mounting of the spring 112 through the two levers 114. This renders the feeler mechanism more flexible and eliminates the stiffness of the construction in my previous machines, secures more delicacy on the leather with less tension, and there is less danger of compressing the stock. Also it eliminates the tendency of the springs to cramp themselves and to cause the feeler posts to bind in their sockets and in the transmission lever as in the machine of my application Serial No. 507,728 (on which this is a direct improvement, as already stated). The levers may be readily lifted out from their sockets or bearings 116 in case of repair, inspection or adjustment.

The same adjustment for the upper roll 2 is provided as in my applications mentioned, consisting of a rotary hand rod 118 provided with worms 119 meshing with the worm wheel heads 120 of adjusting bolts 121 engaging the bearings 122 of said roll. The rolls 2, 3 are provided with intermeshing driving gears 123, 124, the former receiving its impulse from a train of gearing 125, 126, 127, 128, 129, the latter being the power shaft of the machine. A gear 130 on the shaft 129 meshes with the pinion 59 which drives the gear 60 and gage roll 28, and the under roll 131 is driven by a gear 132 engaging the gear 128. An auxiliary setting means for short stock is shown at 133 corresponding to the trip 137 of my application Serial No. 507,728 (and therein claimed).

The general operation of my present machine is the same as in the original machine (of Serial No. 418,008 and Serial No. 507,728) to which the present improvements have been applied, and therefore need not be set forth in detail. One of the principal objects and advantages of my present invention is that thereby the operator can stand at the side of the machine (the right hand side, i.e. behind the machine Fig. 1, or at the right of Fig. 2) and simply feed in the soles with the left hand as fast as the machine will take them, and remove the soles with the right hand, without any danger of getting the soles in wrong and without any liability of mistaking the grade mark. This is because the guides or automatic positioners 89, 90 attend automatically to the proper centering and positioning of the soles at the ingoing end of the machine, so that no skill or attention is required on the part of the operator, and because the automatic visual indicator 86, etc., at the outgoing end of the machine points conspicuously at the exact index or iron-designation directly in front of the operator in the natural direction of his gaze, and so remains until the sole has been grade marked and is delivered from the machine. His attention is neither required for feeding in the ungraded sole nor distracted by being obliged to look at the graded sole (as heretofore) to see what the grade mark thereon is, and hence the machine can be run at its highest speed and a single operator may be confidently depended upon to attend to both the feeding in and the simultaneous distributing of the soles, even though he be an ordinary unskilled operator. When the sole is first inserted in the machine, the forward ends of the wings or positioners 89, 90 are held in position toward each other by their springs 99, so that thereby the heel-end of the sole is caused to engage the rolls 2, 3 at such a point as will insure that the opposite edges of the forepart, when the forepart of the sole has arrived between said rolls, shall respectively be approximately over the posts 105, and as said rolls 2, 3 pull the sole positively forward the positioners 89, 90 yield sufficiently to permit the wider ball portion of the sole to enter. For different kinds of work and varying sizes of crooked soles, for example, the positioners 89, 90 are shifted toward or from each other, as the case may require, by turning the hand wheel 95, so as to move the slide blocks 92 correspondingly in their ways 93, and for different shapes the pins 97 may be shifted so as to vary the normal angular positions of the guides 89, 90 with relation to each other. When special block soles with wide heels are to be graded, such as shown in Fig. 5, stops at 100 are used at one side or the other according as right or left soles are being run through the machine, so as to prevent the adjacent guide from shifting the long edge of the heel over too far, which would move the sole beyond the center of the shank. This automatic centering feature of my invention makes it possible to hollow out the rolls for a wider region at the center of the rolls, thereby minimizing the liability of engaging the sole appreciably back from its edges. Hence the rolls feel of the edges of the soles with extreme accuracy.

As the sole enters the machine and strikes the trip 4, it thereby releases the pawl 10 so as to permit the latter to engage the teeth 13 of the ratchet wheel 14 and thereafter take up each successive increment of thinness measurement detected by the approach of the roll 3 toward the roll 2. As the roll 3 moves up and down in response to the variations in thickness of the sole being felt of, the spring 109 holds the transmission lever 17 under uniform tension away from said roll, irrespective of the swinging movement of the transmission lever, and the spring 112, operated through the balanced levers 114 maintains the same pressure at one end of the roll as at the other, irrespective of whether a thick sole or a thin sole is being fed, and irrespective of relative variations in thickness at the opposite edges of said sole. Such variations of thickness are transmitted to the lever 17 by one or the other of the detectors 105. The transmission lever, by the engagement of its sector end with the sector 16, rocks the shaft 15 and thereby, through the members 21, 22, 23, 24, 25, 26, 29, and 31, correspondingly rotates the thickness wheel or grading die 76. When the sole has been graded to its toe end, the gate 35 thereupon falls, and through the dog 37 sets or locks the ratchet wheel 14 against further grading movement. It will be understood that meanwhile the operator has set the size die or marking wheel 77 in accordance with the size of the bunch of soles being graded at the time. Then as the sole, in its forward movement engages and lifts the gage roll 28 it thereby, through the members 50, 48, 53, 54, 55, 56, 58, 61, 62, and 63 rotates the cam lifter 65 over to the left, Fig. 7, which permits the spring 75 instantly to lower the grade marking mechanism, so that the marking wheels 76, 77 can give their stamping blow upon the upper side of the sole, being instantly retracted or carried back upward again by the continued rotation of said lifting cam 65, and as the later again reaches its position shown in Fig. 7, it is brought to a halt by the tripping mechanism 68, 67, 66, etc. The same automatic adjustment which set the grading wheel 76 also operated through the members 29, 31, 85, and 86 to shift the indicator 86 over the graduated plate 87 to point to that sole-iron or index figure on said plate which corresponds to the iron to which the die wheel 76 has been set. This visual indicator 86, 87 remains thus set while the grading of the sole is being completed, as for instance, being skived by the skiving knife 134, Figs. 2 and 7. And it will be understood that, as stated in connection with my previous grading machines, the grading means may consist of any form of marking, evening, or indicating mechanism, whereby the feeler determinations of the feeler mechanism are usefully perpetuated with relation to the stock. As the heel-end of the sole emerges from the machine, the operator grasps it and at the same time observes the grade mark as shown by the visual indicator, thus set, so that he may know just what bin or compartment to put the sole into when it escapes from the machine. As the sole escapes from the machine, the roll 28 falls and thereby, through the parts 50, 48, 41, and 42, opens the gate 35 to permit the operator to feed in another sole, the same movement unlocking the locking dog 37, from the ratchet wheel 14, the feeler mechanism having been previously restored by the spring 112 and the weight 9, when permitted to do so by the passing of the stock.

As already explained, the general features of my machine herein claimed as my present improvements have been applied to that form of machine which is shown and duly claimed in my before mentioned copending applications. It will also be understood that my improvements which form the subject matter of this case, are believed to be in certain particulars quite broadly novel and can therefore be carried out, within the spirit and scope of certain of the claims, by a wide variety of mechanical embodiments, and that accordingly, I am not restricted, except as otherwise required by certain of the claims, to that arrangement, relation and combination of parts herein set forth as constituting the preferred embodiment of my improved machine.

Having described my invention, what I claim as new and desire to secure by Letters Patent is:

1. In a machine of the kind described, grading mechanism, feeler mechanism governing said grading mechanism for detecting the thinnest edge portion in a piece of stock being graded, and automatic positioning means for controlling the position of said stock with reference to said feeler mechanism so as to position the said edge portions of the stock in proper relation to the feeler mechanism for said edge detection of the stock.

2. In a machine of the kind described, grading mechanism, feeler mechanism governing said grading mechanism for detecting the thinnest edge portion in a piece of stock being graded, and automatic means for automatically shifting the stock edgewise to a central position at its edges with relation to the feeler mechanism prior to the feeling operation.

3. In a machine of the kind described, grading mechanism, feeler mechanism governing said grading mechanism for detecting the thinnest edge portion in a piece of stock being graded, and opposite yielding positioning devices mounted to engage the opposite edges of a piece of stock for controlling the position edge of the latter with relation to the feeler mechanism.

4. In a machine of the kind described, grading mechanism, feeler mechanism governing said grading mechanism for detecting the thinnest edge portion in a piece of stock being graded, and oppositely movable guides for engaging opposite edges of the stock pivotally mounted for properly positioning said edge portions of the stock with relation to the feeler mechanism.

5. In a machine of the kind described, grading mechanism, feeler mechanism governing said grading mechanism for detecting the thinnest edge portion in a piece of stock being graded, and guides for engaging opposite edges of the stock pivotally mounted and spring held for shifting the stock with relation to the feeler mechanism.

6. In a machine of the kind described, grading mechanism, feeler mechanism governing said grading mechanism for detecting the thinnest edge portion in a piece of stock being graded, pivoted stock-shifting guides for engaging opposite edges of the stock for properly positioning the stock with relation to the feeler mechanism, and adjustable stops for limiting the swinging movement of said guides toward each other at the forward ends.

7. In a machine of the kind described, grading mechanism, feeler mechanism governing said grading mechanism for detecting the thinnest edge portion in a piece of stock being graded, pivoted guides for engaging opposite edges of the stock for properly positioning that portion of the stock which is to be detected with relation to the feeler mechanism, and means for adjusting one of said guides for wide heeled block soles.

8. In a machine of the kind described, grading mechanism, feeler mechanism governing said grading mechanism for detecting the thinnest edge portion in a piece of stock being graded, and mechanism for engaging the narrow forward end of a piece of stock and directing it to proper position to insure the proper positioning of the wider part of a following portion of said stock with relation to said edge-detecting feeler mechanism.

9. In a machine of the kind described, grading mechanism, feeler mechanism governing said grading mechanism for detecting the thinnest edge portion in a piece of stock being graded, and stock-positioning mechanism having a portion adjustable to the width of the wider part of said stock and another portion constructed and operating, when the stock's wider part is so engaged, to engage and direct the narrow forward end of said stock properly with relation to said feeler mechanism to insure the proper edge-detection by said feeler mechanism of said wider part of the stock.

10. In a machine of the kind described, grading mechanism, feeler mechanism governing said grading mechanism for detecting the thinnest edge portion in a piece of stock being graded, and stock positioning mechanism, comprising opposite automatically and independently movable guides for guiding the stock to proper edge position for said edge-detection of the feeler mechanism, and adjusting means for adjusting said guides toward and from each other.

11. In a machine of the kind described, grading mechanism, feeler mechanism governing said grading mechanism for detecting the thinnest edge portion in a piece of stock being graded, and stock positioning mechanism, comprising independently movable guides for controlling the stock at its opposite edges with relation to the feeler mechanism, yielding means for maintaining said guides under normal tendency to move toward each other, and means for adjusting said guides toward and from each other.

12. In a machine of the kind described, grading mechanism, feeler mechanism governing said grading mechanism for detecting the thinnest edge portion in a piece of stock being graded, and stock positioning mechanism, comprising independently movable guides for controlling the stock at its opposite edges with relation to the feeler mechanism, yielding means for maintaining said guides under normal tendency to move toward each other, adjustable stops for limiting the movement of said guides in opposition to said yielding means, and means for adjusting said guides toward and from each other.

13. In a machine of the kind described, grading mechanism comprising a visual indicator facing that side of the machine where the operator naturally stands when in a position for feeding work to the machine, feeler mechanism for feeling of the different thick and thin edge portions in a piece of stock being graded, and connections between said feeler mechanism and said grading mechanism for setting said indicator to indicate the thinnest of all the edge thicknesses felt of, including means operating independently of the feeler mechanism for holding the indicator so set for an appreciable time after the feeling operation to enable the operator fully to observe the grade indicated by the indicator.

14. In a machine of the kind described, grading mechanism comprising a visual indicator facing that side of the machine where the operator naturally stands when in position for feeding work to the machine, feeler mechanism for detecting the thinnest edge portion in a piece of stock being graded, connections between said feeler mechanism and said grading mechanism for governing said indicator to indicate said thinnest edge detection, and automatic stock positioning means for controlling the position of said stock with reference to said feeler mechanism.

15. In a machine of the kind described, feeler mechanism for feeling of the died-out piece of stock at its opposite edges and detecting the thinnest edge portion thereof, grading mechanism comprising a visual indicator responsive to the feeler mechanism for indicating visually to the operator the grade determined by said feeler mechanism, and transmitting and setting mechanism for transmitting the feeler determination to said grading mechanism and holding the latter, including said indicator, set while the stock is in the machine.

16. In a machine of the kind described, means for feeding a died-out leather piece through the machine, feeler mechanism for detecting thin spots in the leather piece, marking means responsive to said feeler mechanism for grade marking the leather piece, stock positioning means at the ingoing end of the machine for automatically positioning the leather piece with relation to the feeler mechanism, and a visual indicator for indicating to the operator the grade of the leather piece as marked by said marking means.

17. In a machine of the kind described, means for feeding a died-out leather piece through the machine, feeler mechanism for detecting thin spots in the leather piece, marking means responsive to said feeler mechanism for grade marking the leather piece, stock positioning means at the ingoing end of the machine for automatically positioning the leather piece with relation to the feeler mechanism, a visual indicator for visually indicating to the operator the grade of the leather piece corresponding to the said grade marking, and means for holding said indicator set while the leather piece remains in the machine.

18. In a machine of the kind described, feeler mechanism for detecting the thin spots in a leather piece to be graded, and grading mechanism governed by said feeler mechanism, including a plurality of markers and a visual indicator, at least one of which is directly responsive to said feeler mechanism, and means for operating said grading mechanism, said visual indicator containing grade-marks and a part movable from one to another of said marks to point out to the operator the grade-mark of the leather piece.

19. In a machine of the kind described, feeler mechanism for detecting thin spots in a leather piece, including rolls for engaging the stock on its opposite sides, at least one of said rolls having its periphery annularly cut away or hollowed out at the middle of its length so as to be ineffective for detecting purposes at said hollowed-out part, the peripheral portions at each side of the hollowed-out portion being cylindrical and parallel to the adjacent portion of the opposite roll for engaging and feeling of the stock at the opposite edges of said stock, stock-positioning means for directing the body of the stock centrally of said hollowed-out portion and with the edges of the stock positioned to be engaged by said parallel portions at either side of the said hollowed-out portion, grading mechanism, and means for transmitting the determinations of the feeler mechanism to said grading mechanism.

20. In a machine of the kind described, feeler mechanism for detecting thin spots in a leather piece, including a member for engaging one side of the stock, a transmission lever, detector posts loosely connecting said member and lever, a spring mounted between said member and lever and movable bodily therewith, and grading mechanism governed by said feeler mechanism.

21. In a machine of the kind described, feeler mechanism for detecting thin spots in a leather piece, including a member for engaging one side of the stock, a transmission lever, detector posts loosely connecting said member and lever, a spring mounted between said member and lever and movable bodily therewith, means operating on said intermediately placed spring and on one of the adjacent parts for adjusting the tension to the requirements of the stock, and grading mechanism governed by said feeler mechanism.

22. In a machine of the kind described, feeler mechanism, including a lower member for engaging the under side of a piece of stock whose grade is to be determined, and pressure applying means for applying the same pressure to the opposite ends of said member, including opposite levers, each pivoted intermediate its ends, and a spring common to said two levers for maintaining them under balanced upward pressure with relation to said member.

23. In a machine of the kind described, feeler mechanism for determining the thin spots of a leather piece, including opposite members for engaging the top and bottom sides of said leather piece, pressure levers, a spring common to said two levers for maintaining said members under constant pressure toward each other, and open bearings for removably supporting the pivots of said levers.

24. In a machine of the kind described, feeler mechanism for detecting the thin spots in a leather piece to be graded, and grading mechanism governed by said feeler mechanism, including a plurality of rotary markers, one of which contains thickness grade-marks and is directly responsive to said feeler mechanism, and the other of which contains width grade-marks, means for operating said grading mechanism to grade-mark the work with said plurality of grade-marks, the latter being located to mark the same piece with the several different marks, means for permitting and facilitating the adjustment of said width-grade-marker step by step by hand, and means for rendering said width-grade-marker inoperative when desired.

In testimony whereof, I have signed my name to this specification, in the presence of two subscribing witnesses.

ELMER P. NICHOLS.

Witnesses:
  GEO. H. MAXWELL,
  JAMES R. HODDER.